US009661225B2

(12) United States Patent
Jen

(10) Patent No.: US 9,661,225 B2
(45) Date of Patent: May 23, 2017

(54) IMAGE CAPTURING APPARATUS AND METHOD THEREOF

(71) Applicant: Chiun Mai Communication Systems, Inc., New Taipei (TW)

(72) Inventor: Chih-Fu Jen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/954,991

(22) Filed: Nov. 30, 2015

(65) Prior Publication Data

US 2016/0156848 A1    Jun. 2, 2016

(30) Foreign Application Priority Data

Dec. 1, 2014    (CN) .......................... 2014 1 0711362

(51) Int. Cl.
*H04N 5/232*    (2006.01)

(52) U.S. Cl.
CPC ..... *H04N 5/23258* (2013.01); *H04N 5/23222* (2013.01)

(58) Field of Classification Search
None
See application file for complete search history.

(56) References Cited

U.S. PATENT DOCUMENTS

| 6,630,950 B1* | 10/2003 | Ohkawara | H04N 5/23248 348/208.11 |
| 9,392,172 B2* | 7/2016 | Saitsu | H04N 5/23258 |
| 2008/0180536 A1* | 7/2008 | Nakahara | H04N 5/232 348/208.99 |
| 2009/0231450 A1* | 9/2009 | Tanaka | G03B 5/02 348/208.7 |
| 2010/0208088 A1* | 8/2010 | Nakai | H04N 5/23241 348/208.4 |

* cited by examiner

*Primary Examiner* — Shahbaz Nazrul
(74) *Attorney, Agent, or Firm* — Steven Reiss

(57) ABSTRACT

The present disclosure provides an image capturing apparatus for operatively capturing images of an object. The apparatus includes an image capturing module, a shutter, an aperture, setting module, a control module, and a storage module. The setting module determines a threshold value of the image capturing apparatus based on an aperture setting value of the aperture and a shutter setting value of the shutter. The control module drives an accelerometer to detect at least one acceleration value of the image capturing apparatus in a predefined detection period that is initiated when the image capturing apparatus executes an image capturing operation. When an acceleration value detected is determined to be smaller than the threshold value, the control module causes the image capturing module to capture an image of the object.

16 Claims, 2 Drawing Sheets

IMAGE CAPTURING APPARATUS AND METHOD THEREOF

CROSS-REFERENCE TO RELATED APPLICATIONS

This application claims priority to Chinese Patent Application No. 201410711362.1 filed on Dec. 1, 2012 in the China Intellectual Property Office, the contents of which are incorporated by reference herein.

FIELD

The subject matter herein generally relates to image capturing, in particular to an image capturing apparatus and a method thereof.

BACKGROUND

Regardless of how steady a camera is held by a user while taking pictures, inadvertent shaking may still occur at the moment the user presses the shutter button, which induces motion blur to images captured. Techniques such as increasing the International Standard Organization (ISO) sensitivity setting of the camera to increase the shutter speed and using an anti-shake algorithm to compute motion estimation between consecutive images captured and perform pixel compensation to remove blurry pixels accordingly have been commonly used to address camera shake. However an increase in the ISO sensitivity of the camera also increases image noises, and compensated blurry pixels reduces number of usable pixels, and degrades the overall image quality.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
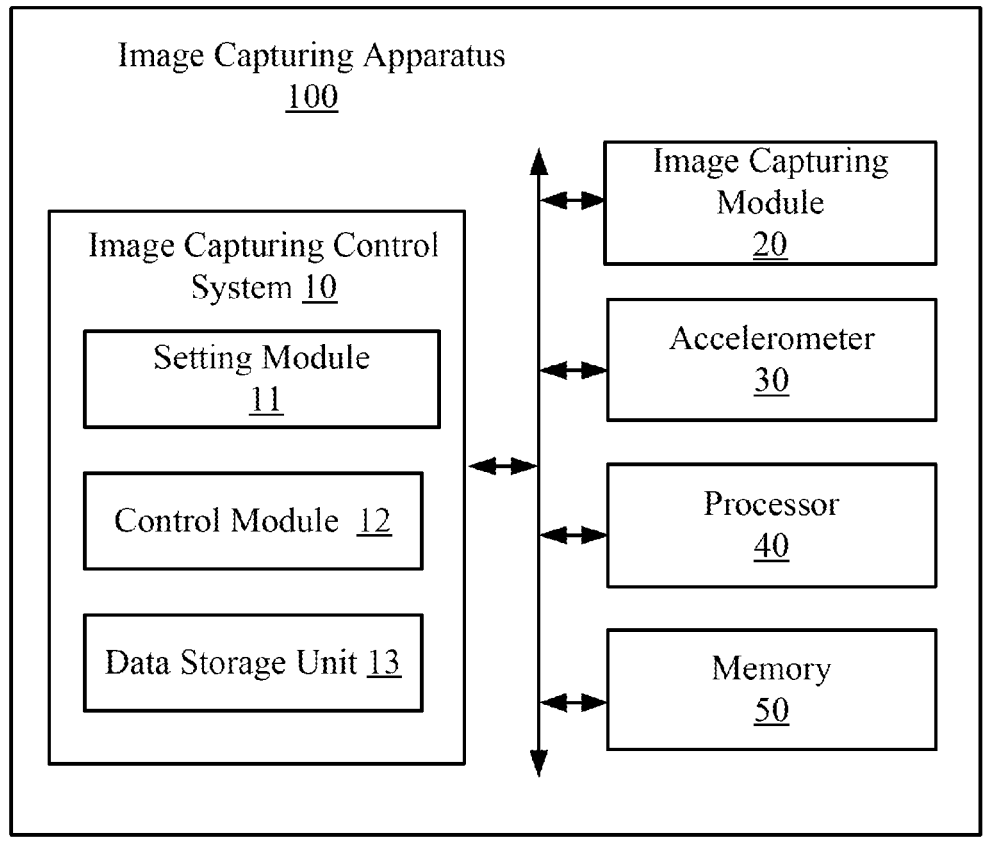
FIG. 1 is a diagram illustrating an image capturing apparatus provided in accordance to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The term "comprising" means "including, but not necessarily limited to"; it specifically indicates open-ended inclusion or membership in a so-described combination, group, series and the like.

The present disclosure provides an image capturing apparatus to address modern camera shaking issue without degrading the image quality. The image capturing apparatus disclosed achieves anti-shake by determining the optimal timing for capturing images using an accelerometer, thereby reduces the occurrence of image blurring due to camera shaking or undesired movement and enhances the overall image quality. The image capturing apparatus not only can effectively reduce or even eliminate the impact of camera shaking on image quality, but also consumes less power in comparison to the existing anti-shaking mechanism.

FIG. 1 illustrates an image capturing apparatus provided in accordance to an exemplary embodiment of the present disclosure. An image capturing apparatus 100 includes an image capturing system 10, an image capturing module 20, an accelerometer 30, a processor 40, and a memory 50. The processor 40 is electrically connected to the image capturing module 20, the accelerometer 30, and the memory 50 via a data bus. The image capturing system 10 is accessible by the processor 40 via the data bus.

The image capturing apparatus 100 further includes an aperture (not shown) and a shutter (not shown). The aperture and the shutter are communicatively coupled to the image capturing system 10. An aperture value of the aperture corresponds to the size of the aperture and controls the amount of light that can pass through the aperture. The aperture value is measured in f-number or f-stop value, f/1.0, f/1.4, f/2.0, f/2.8, f/4.0, and f/5.6. A shutter setting value is referred as shutter speed or exposure time. The shutter setting value determines the exposure period of image capturing module 20 or how long the light is permitted to be exposed to the image capturing module. Common shutter setting value includes but not limited to ¹⁄₂₀ s, ¹⁄₃₀ s, ¹⁄₂₀₀ s. A faster shutter speed indicates a shorter exposure period and a slower shutter speed indicates a longer exposure period.

The image capturing apparatus 100 in the instant embodiment is an apparatus capable of performing image capturing operations, and includes but is not limited to a digital camera, a single lens reflex (SLR) camera, a camcorder. The image capturing apparatus 100 in at least one embodiment can be installed on a handheld device such as a smartphone or tablet.

The image capturing module 20 is configured to capture images corresponding to an object (e.g., articles, person, and landscape). The image capturing module 20 comprises a lens and an image sensor. Information regarding the hardware architecture (e.g., the lens structure and the image sensor structure) and the basic image capturing operation of the image capturing module 20 are known to those skilled in the art. Detailed explanations are omitted, and only relevant information will be provided herein.

The accelerometer 30 is configured to detect the movement or vibration of the image capturing apparatus 100. In the instant embodiment, the accelerometer 30 is configured to detect accelerations of the image capturing apparatus 100 and generate acceleration values representing the shaking level associated with the image capturing apparatus 100. In at least one embodiment, the accelerometer 30 detects acceleration values associated of the image capturing apparatus 100 over multiple axes (e.g., X-axis, Y-axis, and Z-axis) of a space and generating an acceleration vector accordingly for computing the acceleration value. In at least one embodiment, the accelerometer 30 may be implemented by a G-sensor. In the instant embodiment, the accelerometer 30 is built in the image capturing apparatus 100, however, in at least one embodiment, the accelerometer 30 may be an external device connected to the image capturing apparatus 100. Those skilled in the art should be able to implement the accelerometer based on the practice operation and/or design requirements.

The processor 40 is the operation core of the image capturing apparatus 100. The processor 40 is configured to control the operations of the image capturing system 10, the image capturing module 20, the accelerometer 30, and the memory 50. The processor 40 is configured to execute applications for supporting the operation of the image capturing apparatus 100. The processor 40 is implemented by a processing chip including but is not limited to a microcontroller or an embedded controller.

The memory 50 is configured to store the operation and processing data for the processor 40 to access and execute. The operation data at least includes the configuration setting of the image capturing system 10 and images captured by the image capturing module 20. In at least one embodiment, the memory 50 is also configured to store the aperture value and the shutter setting value. The memory 50 can be a built-in memory (e.g., a SD card) in the image capturing apparatus 100 or an external storage device connected to the image capturing apparatus 100. The memory 50 may be implemented by a volatile or a non-volatile memory such as a flash memory, a read only memory (ROM), or a random access memory (RAM), however the instant embodiment is not limited to the example provided herein.

The image capturing system 10 is configured for driving the accelerometer 30 to detect the accelerations of the image capturing apparatus 20 and determining the optimal timing to drive the image capturing module 20 to capture images based on the acceleration detection results.

In the instant embodiment, the image capturing system 10 includes a setting module 11, a control module 12, and a data storage unit 13. The setting module 11 is communicatively coupled to the aperture, the shutter, and the memory 50. The setting module 11 is further communicatively coupled to the control module 12, and the data storage unit 13. The control module 12 is communicatively coupled to the data storage unit 13, the image capturing module 20, and the memory 50 via the data bus.

The setting module 11 is configured to determine the aperture value of the aperture and the shutter setting value of the shutter, and determine a threshold value associated with the image capturing apparatus 100.

It is noteworthy that the threshold value herein is an acceleration baseline value, which can enable the image capturing apparatus 100 to produce high quality images without having to perform pixel compensation to remove blur pixels. For instance, when the acceleration value associated with the image capturing apparatus 30 detected by the accelerometer 30 is less than the threshold value, which indicates the quality of the image captured by the image capturing module 20 is high and acceptable, and no pixel compensation needs to be performed.

In at least one embodiment, the relationship between the aperture value and the shutter setting value and the threshold value can be predefined using a table. The table can be stored in the memory 50 for the setting module 11 to access via the data bus.

An exemplary relationship among the aperture value, the shutter setting value, and the threshold value is provided in Table 1 below.

TABLE 1

| Aperture value | Shutter Setting Value (Shutter Speed (s)) | Threshold Value (mm/s$^2$) |
|---|---|---|
| 2.8 | 1/30 | 3 |
| 2.8 | 1/60 | 6 |
| 4 | 1/30 | 2.122 |
| 5.6 | 1/30 | 1.5 |

It is noteworthy that Table 1 is merely served as an illustration, and different type/model of the image capturing apparatus 100 will have different relationship. The exact actual relationship depends upon the exact implementation of the image capturing apparatus 100. In at least one embodiment, the relationship among the aperture value, the shutter setting value and the threshold value may be obtained through experimentation.

The setting module 11 first determines the aperture value and the shutter setting value. In at least one embodiment, the setting module 11 accesses the memory 50 to obtain the aperture value and the shutter setting value. In at least one embodiment, the setting module 11 directly obtains the aperture value from the aperture and the shutter setting value from the shutter. Next, the setting module 11 searches and obtains the proper threshold value associated with the image capturing apparatus 100 with the aperture value and the shutter setting value using the table. For instance, if the aperture value of the aperture is set as f/2.8, and the shutter setting value of the shutter is set as 1/30 s, after obtaining the aperture value and the shutter setting value, the setting module 11 searches the table (e.g., Table 1) and obtains the corresponding threshold value to be 3 mm/s$^2$.

The control module 12 is configured to drive the accelerometer 30 to detect the acceleration (i.e., the acceleration value) of the image capturing apparatus 100 when the image capturing apparatus 100 executes an image capturing operation. Briefly, when the image capturing apparatus 100 executes an image capturing operation (e.g., when a shutter button or an image capturing button is manually pressed), the control module 12 drives the accelerometer 30 to detect at least one acceleration value of the image capturing apparatus 100 in a predefined detection period that is initiated when the image capturing apparatus 100 executes an image capturing operation, and determines whether the acceleration value detected is less than the threshold value (e.g., 3 mm/s$^2$). When the control module 12 determines that the acceleration value detected is less than the threshold value (e.g., 3 mm/s$^2$), the control module 12 drives the image capturing module 20 to capture an image corresponding to an object (e.g., a person or a landscape).

In at least one embodiment, the control module 12 drives the accelerometer 30 to determine the acceleration values associated with the image capturing apparatus 100 at one or multiple detection time points in the predefined detection period initiated when the image capturing apparatus 100 is triggered to execute the image capturing operation.

In at least one embodiment, the image capturing apparatus 100 further includes a counter (not shown), and the counter is configured to start counting the predefined detection period when the image capturing apparatus 100 executes an image capturing operation. The predefined detection period comprises a plurality of detection time points spaced with a predefined time interval. When the image capturing apparatus 100 executes an image capturing operation (e.g., when a shutter button or an image capturing button is pressed by a user), the control module 12 drives the accelerometer 30 to detect acceleration values of the image capturing apparatus 100 at the detection time points.

In the instant embodiment, the control module 12 sets the starting time point of the predefined detection period to be the time point that the image capturing apparatus 100 executes an image capturing operation and drives the accelerometer 30 to detect the acceleration value associated with the image capturing apparatus 100. Thereafter, the control module 12 can drive the accelerometer 30 to detect the acceleration value associated with the image capturing apparatus 100 after every predefined time interval (e.g., 0.1 s).

In at least one embodiment, the predefined detection period herein is the maximum response time (e.g., 0.5 s) starting from the time the image capturing apparatus 100 is initiated to capture an image to the time the image is captured and stored to the memory 50. The predefined detection period and the predefined time interval may be configured automatically by the control module 12 or modified by the user.

In at least one embodiment, the predefined detection period includes a fixed number of detection time points (e.g., 5 detection time points) pre-configured by the control module 12 or configured by the user via a user interface equipped on the image capturing apparatus 100.

In at least one embodiment, when the control module 12 determines that the acceleration value instantly detected is greater than the threshold value (e.g., 3 mm/s$^2$), and the control module 12 records the acceleration value in the acceleration file. The control module 12 further determines whether the acceleration value currently detected is the smallest acceleration value among all the acceleration values recorded in the acceleration file In the instant embodiment, the memory 50 is configured for temporarily storing an image file containing images captured by the image capturing module and the acceleration file. The acceleration file is created by the control module 12 and the acceleration file comprises a plurality of acceleration values greater than the threshold value recorded during the predefined detection period that is initiated when the image capturing apparatus 100 executes the image capturing operation.

When the control module 12 determines that the acceleration value currently detected is the smallest acceleration value, the control module 12 drives the image capturing module 20 to capture the image corresponding to the object and stores the image captured in the image file. When the control module 12 determines that the acceleration value currently detected is not the smallest acceleration value and the predefined detection period has not yet expired (i.e., the next detection time point associated with the current detection time point of the acceleration value recorded lies inside the predefined detection period), the control module 12 drives the accelerometer 30 to repeatedly detect the acceleration value of the image capturing apparatus 100, such as detecting the acceleration value of the image capturing apparatus 100 at the next detection time point.

When the control module 12 determines that the acceleration value currently detected is not the smallest acceleration value in the acceleration file and the predefined detection period has expired (i.e., the next detection time point associated with the current detection time point of the acceleration value lies outside the predefined detection period), the control module 12 obtains the last captured image form the image files and stores the last captured image into the memory 50 for further processing. The control module 12 further deletes the acceleration file and the image file from the memory 50.

In at least one embodiment, the image capturing system 10 is implemented by programming the processor 40 to execute an image capturing application program, wherein the instructions or codes for the image capturing application program may be stored in the memory 50.

In at least one embodiment, the data storage unit 13 is implemented by allocating the required memory space from the memory 50 via memory partition technique.

In at least one embodiment, the data storage unit 13 is a buffer allocated from the memory 50. In at least one embodiment, the data storage unit 13 is implemented by a register of the processor 40.

Figure 2:
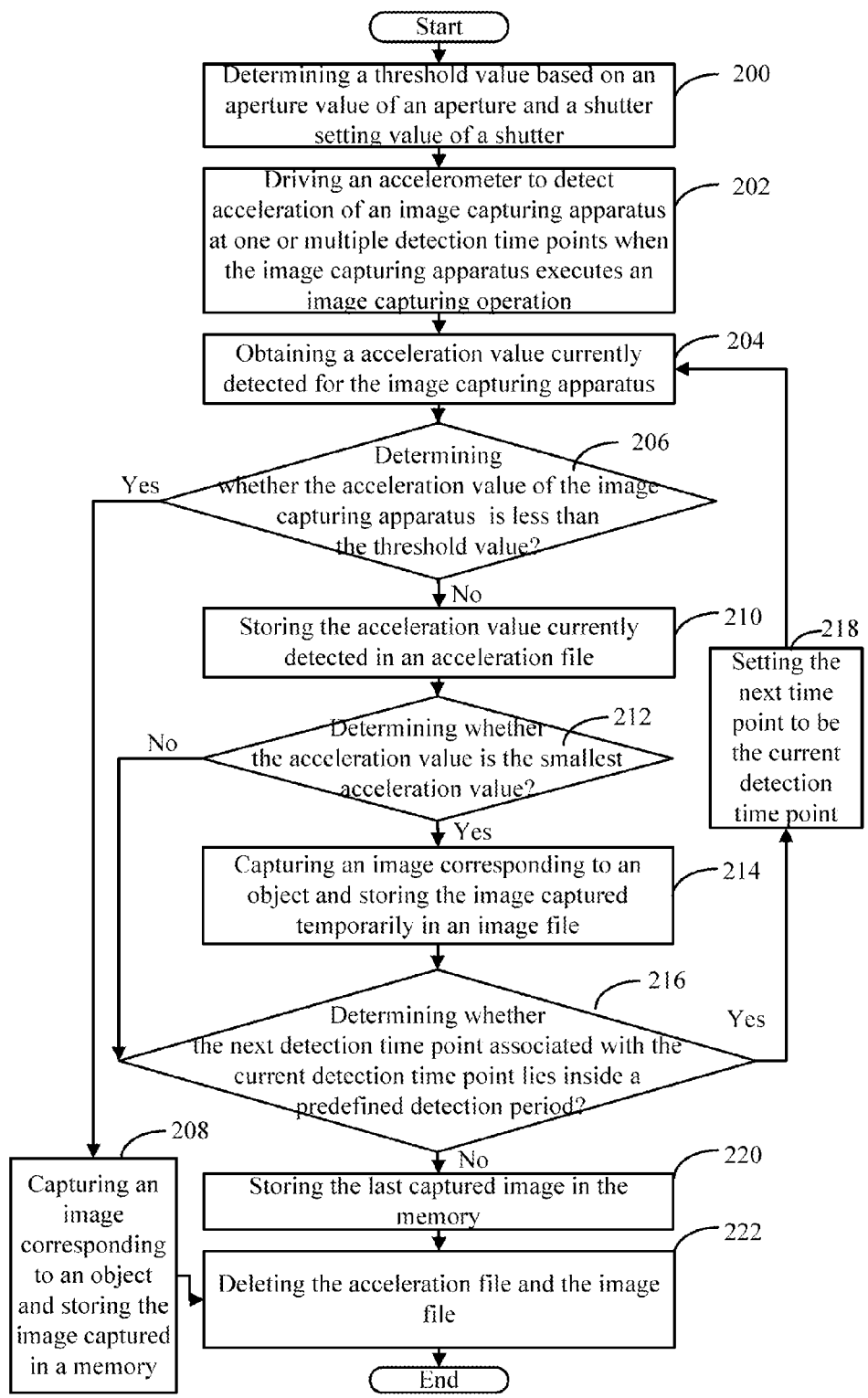
FIG. 2 is a flowchart diagram illustrating an image capturing method provided in accordance to an exemplary embodiment of the present disclosure.

Referring to FIG. 2 in conjunction to FIG. 1, which illustrates a flowchart of an image capturing method provided in accordance to an exemplary embodiment of the present disclosure.

The image capturing method depicted in FIG. 2 is provided by way of example, as there are a variety of ways to carry out the method. The image capturing method described below can be carried out using the configurations illustrated in FIG. 1, for example, and various elements of these figures are referenced in explaining the image capturing method. Each block shown in FIG. 2 represents one or more processes, methods or subroutines, carried out in the image capturing method. Furthermore, the illustrated order of blocks is illustrative only and the order of the blocks can change according to the present disclosure. Additional blocks can be added or fewer blocks may be utilized, without departing from this disclosure.

At block 200, the setting module 11 determines the aperture value of the aperture and the shutter setting value of the shutter. The aperture value of the aperture and the shutter setting value of the shutter may be configured based on the image capturing operation of the image capturing apparatus 100 and stored in the memory 50.

In at least one embodiment, the aperture value of the aperture is set to be f/2.8 and the shutter setting value of the shutter is set to be ⅙₀ s in response to a specific image capturing operation. After determining the aperture value and the shutter setting value, the setting module 11 obtains a corresponding threshold value (e.g., 6 mm/s$^2$) by searching a table (e.g., Table 1) with the aperture value and the shutter setting value.

In the instant embodiment, the relationship among the aperture value, the shutter setting value, and the threshold value is predefined using a table. The table may be stored in the memory 50 for the setting module 11 to access via the data bus.

At block 202, the control module 12 drives the accelerometer 30 to detect the current acceleration of the image capturing apparatus 100 at one or multiple detection time points in a predefine detection period initiated when the image capturing apparatus 100 executes an image capturing operation.

The predefined detection period is initiated after the image capturing apparatus 100 executes the image capturing operation for the control module 12 to detect the timing to detect the acceleration value of the image capturing apparatus 100. In at least one embodiment, the predefine detection period is pre-configured based on the maximum response time (e.g., 0.5 s) for the image capturing apparatus 100 to react in response to the user-initiated image capturing operation. In at least one embodiment, a counter of the image capturing apparatus 100 starts to count the predefined detection period.

In at least one embodiment, when a user of the image capturing apparatus 100 presses a shutter button causing the image capturing apparatus 100 to execute the image capturing operation, the control module 12 operatively drives the accelerometer 30 to detect the current acceleration of the image capturing apparatus 100. At block 204, the control module 12 obtains an acceleration value of the image capturing apparatus 100 generated by the accelerometer 30 at the current detection time point.

In at least one embodiment, the predefined detection period comprises a plurality of detection time points spaced with a predefined time interval (e.g., 0.1 s). When the image capturing apparatus 100 executes the image capturing operation, the control module 12 drives the accelerometer 30 to detect an acceleration value of the image capturing apparatus 100 at each of these detection time points.

At block 206, the control module 12 determines whether the current acceleration value of the image capturing apparatus 100 is less than the threshold value (e.g., 6 mm/s$^2$). When the control module 12 determines that the current acceleration value of the image capturing apparatus 100 is less than the threshold value (e.g., 6 mm/s$^2$), the control module executes block 208. When the control module 12 determines that the current acceleration value of the image capturing apparatus 100 is greater than the threshold value (e.g., 6 mm/s$^2$), the control module executes block 210.

At block 208, the control module 12 determines that the current acceleration value of the image capturing apparatus 100 is less than the threshold value (e.g., 6 mm/s$^2$), which indicates that the image capturing apparatus 100 is capable of capturing and producing a clear image, the control module 12 then controls the image capturing module 20 to capture an image corresponding to an object (e.g., an article, a person, or a landscape) and stores the image captured in the memory 50 for subsequent processing (e.g., display the image captured on a display of the image capturing apparatus for the user to view). After block 208, the control module 12 executes block 222.

At block 210, the control module 12 determines that the current acceleration value of the image capturing apparatus 100 is greater than the threshold value (e.g., 6 mm/s2), which indicates that the motion of the image capturing apparatus 100 leads to the generation of a blurry image, the control module 12 stores the current detected acceleration value in an acceleration file. The acceleration file in the instant embodiment is created and stored in the memory 50. The acceleration file records a plurality of acceleration values greater than the threshold value.

At block 212, the control module 12 determines whether the current detected acceleration value is the smallest acceleration value among all the acceleration values previously recorded in the acceleration file. In at least one embodiment, the control module 12 can compare the current detected acceleration value with the previously recorded acceleration values in the acceleration file to determine whether the current detected acceleration value is the smallest acceleration value.

At block 214, the control module 12 drives the image capturing module 20 of the image capturing apparatus 100 to capture an image corresponding to the object, and stores the image captured temporarily in an image file. The image file is created and stored in the memory 50.

At block 216, the control module 12 determines whether the next detection time point associated with the current detection time point lies inside the predefined detection period. When the control module 12 determines that the next detection time point lies inside the predefined detection period, i.e., the predefined detection period has not expired, the control module 12 executes block 218; otherwise, the control module 12 determines that the predefined detection period has expired and the control module 12 executes block 220.

At block 218, when the control module 12 determines that the next detection time point lies inside the predefined detection period, the control module 12 re-sets the next detection time point to be the current detection time point and returns to block 204 to re-detect the acceleration value of the image capturing apparatus 100 at the current detection time point. The next detection time point is determined by adding a predefined time interval (e.g., 0.1 s) to the current detection time point. The predefined time interval may be defined by the control module 12 or by the user via a user interface.

At block 220, when the control module 12 determines that the next detection time point lies outside the predefined detection period, the control module 12 obtains the last captured image from the image file and stores the last captured image into the memory 50 for further processing. In other words, when the predefined detection period expires, the control module 12 sets the last captured image as the image captured during the current image capturing session initiated by the user.

At block 222, the control module 12 deletes the acceleration file and the image file.

The present disclosure further provides another image capturing method for an image capturing apparatus having an image capturing module, an aperture, a shutter, and an accelerometer. The image capturing apparatus includes but is not limited to a digital camera, a single lens reflex (SLR) camera, a camcorder. The image capturing apparatus may also be installed on a handheld device such as a smartphone or a tablet.

The image capturing method includes a setting module that determines a threshold value based on an aperture value of the aperture and a shutter setting value of the shutter, a control module that drives the accelerometer of the image capturing apparatus, to detect at least one acceleration value associated with the image capturing apparatus when the image capturing apparatus executes an image capturing operation (e.g., when a user presses a shutter button or an image capturing button to cause the image capturing apparatus to capture an image corresponding to an object (e.g., an article, a person or landscape), and to drive the image capturing module to capture an image corresponding to an object upon determining that the acceleration value detected is less than the threshold value.

In at least one embodiment, the image capturing method further includes providing a memory configured for storing acceleration values detected and images captured by the image capturing module. The memory may be configured to store a look-up table that records the relationship between the threshold value and the aperture value and the shutter setting value. The setting module determines the threshold value by searching the look-up table with the aperture value and the shutter setting value.

Additionally, the present disclosure also discloses a non-transitory computer-readable medium for storing the computer executable program codes of the image capturing method depicted in FIG. 2. The non-transitory computer-readable media may be a floppy disk, a hard disk, a compact disk (CD), a flash drive, a magnetic tape, accessible online storage database or any type of storage medium having similar functionality known to those skilled in the art. The codes can be read only and executed by the processor 40 of the image capturing apparatus 100.

In summary, the present disclosure provides an image capturing apparatus and an image capturing method, which achieve anti-shake by determining the optimal timing for capturing images using an accelerometer, thereby reducing the occurrence of image blurring due to camera shaking or undesired movement and lowering the overall power consumption.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for capturing an image using an image capturing apparatus having an accelerometer, an aperture and a shutter, the method comprising:
    determining, by the image capturing apparatus, an aperture value of the aperture and a shutter setting value of the shutter;
    determining, by the image capturing apparatus, a threshold value based on the aperture value of the aperture and the shutter setting value of the shutter; and
    causing the accelerometer to detect at least one acceleration value of the image capturing apparatus in a predefined detection period that is initiated when the image capturing apparatus executes an image capturing operation; and
    causing the image capturing apparatus to capture an image corresponding to an object upon determining that the acceleration value detected is less than the threshold value.

2. The method according to claim 1, further comprising:
    storing, in a memory of the image capturing apparatus, acceleration values detected and images captured.

3. The method according to claim 2, further comprising:
    storing in the memory, a look-up table that records the relationship between the threshold value and the aperture value and the shutter setting value.

4. The image capturing method according to claim 3, wherein the operation of determining the threshold value based on the aperture value of the aperture and the shutter setting value of the shutter further comprises:
    obtaining, by the image capturing apparatus, the aperture value for the aperture and the shutter setting value for the shutter; and
    determining, by the image capturing apparatus, the threshold value using the look-up table, the aperture value, and the shutter setting value.

5. The method according to claim 1, further comprising:
    recording, by the image capturing apparatus, the acceleration value in an acceleration file when the image capturing apparatus determined that the acceleration value detected is greater than the threshold value, wherein the acceleration file contains a plurality acceleration values greater than the threshold value recorded during the predefined detection period;
    determining, by the image capturing apparatus, whether the acceleration value currently detected is the smallest acceleration value of the acceleration values in the acceleration file;
    when the acceleration value currently detected is the smallest acceleration value in the acceleration file, causing the image capturing apparatus to capture the image corresponding to the object and stores the image captured in an image file; and
    when the predefined detection period has expired, causing the image capturing apparatus to delete the acceleration file and the image file.

6. The image capturing method according to claim 5, wherein when the image capturing apparatus determines that the predefined detection period has not expired, the accelerometer repeatedly detect the acceleration value of the image capturing apparatus.

7. The image capturing method according to claim 1, wherein the image capturing operation further comprises:
    counting, by the image capturing apparatus, the predefined detection period when the image capturing apparatus executes the image capturing operation, wherein the predefined detection period comprises a plurality of detection time points spaced with a predefined time interval; and
    detecting, by the image capturing apparatus, a plurality of acceleration values associate with the image capturing apparatus at the detection time points, respectively.

8. The image capturing method according to claim 7, wherein the first detection time point is set as the starting time point of the predefined detection period.

9. An image capturing apparatus having an aperture, a shutter, and a accelerometer, the image capturing apparatus comprising:
    an image capturing module configured to operatively capture an image of an object;
    a setting module coupled to the aperture and the shutter, configured to determine a threshold value based on the aperture value of the aperture and the shutter setting value of the shutter; and
    a control module coupled to the image capturing module and the accelerometer, configured to drive the accelerometer to detect at least one acceleration value of the image capturing apparatus in a predefined detection period that is initiated when the image capturing apparatus executes an image capturing operation;
    wherein when the control module determines that the acceleration value detected is less than the threshold value, the control module drives the image capturing module to capture the image corresponding to the object.

10. The image capturing apparatus according to 9, further comprises:
    a memory, configured to store image captured by the image capturing module.

11. The image capturing apparatus according to claim 10, wherein the memory is configured to stores a look-up table that defines the relationship between the threshold value and the aperture value and the shutter setting value.

12. The image capturing apparatus according to claim 11, wherein the setting module is configured to determine the threshold value using the look-up table, the aperture value, and the shutter setting value.

13. The image capturing apparatus according to 9, wherein the control module records the acceleration value in an acceleration file when the control module determines that the acceleration value is greater than the threshold value, and the control module further determines whether the acceleration value currently detected is the smallest acceleration value of the acceleration values in the acceleration file, wherein the acceleration file contains a plurality of acceleration values greater than the threshold value recorded during the predefined detection period;

wherein when the control module determines that the acceleration value currently detected is the smallest acceleration value in the acceleration file, the control module drives the image capturing module to capture the image corresponding to the object and stores the image captured in an image file;

wherein when the control module determines that the predefined detection period has expired, the control module deletes the acceleration file and the image file.

14. The image capturing apparatus according to claim 9, wherein when the control module determines that the predefined detection period has not expired, the control module drives the accelerometer to repeatedly detect the acceleration value of the image capturing apparatus.

15. The image capturing apparatus according to claim 9, wherein further comprising:

a counting module coupled to the control module, configured to start counting the predefined detection period when the image capturing apparatus executes the image capturing operation, wherein the predefined detection period comprises a plurality of detection time points spaced with a predefined time interval between consecutives time points;

wherein the control module drives the accelerometer to detect a plurality of acceleration values associate with the image capturing apparatus at the detection time points, respectively.

16. The image capturing apparatus according to claim 15, wherein the first detection time point is set as the starting time point of the predefined detection period.

* * * * *